(12) United States Patent
Jiang et al.

(10) Patent No.: US 12,218,573 B2
(45) Date of Patent: Feb. 4, 2025

(54) CONTROL CIRCUIT FOR DC-DC CONVERTERS WITH NONLINEAR ADAPTIVE VOLTAGE POSITION AND CONTROL METHOD THEREOF

(71) Applicant: Chengdu Monolithic Power Systems Co., Ltd., Chengdu (CN)

(72) Inventors: Lijie Jiang, Hangzhou (CN); Fangyu Zhang, Hangzhou (CN); Ming Chen, Hangzhou (CN)

(73) Assignee: Chengdu Monolithic Power Systems Co., Ltd., Sichuan (CN)

(*) Notice: Subject to any disclaimer, the term of this patent is extended or adjusted under 35 U.S.C. 154(b) by 217 days.

(21) Appl. No.: 17/966,031

(22) Filed: Oct. 14, 2022

(65) Prior Publication Data
US 2023/0138397 A1    May 4, 2023

(30) Foreign Application Priority Data

Nov. 1, 2021 (CN) .......................... 202111284124.3

(51) Int. Cl.
*H02M 3/156* (2006.01)
*H02M 1/00* (2006.01)
*H02M 1/08* (2006.01)

(52) U.S. Cl.
CPC ....... *H02M 1/0025* (2021.05); *H02M 1/0009* (2021.05); *H02M 1/08* (2013.01); *H02M 3/156* (2013.01)

(58) Field of Classification Search
CPC .... H02M 1/0009; H02M 1/0025; H02M 1/08; H02M 3/156; H02M 3/158
See application file for complete search history.

(56) References Cited

U.S. PATENT DOCUMENTS

| | | | |
|---|---|---|---|
| 8,395,368 | B2 | 3/2013 | Qian |
| 8,829,872 | B1* | 9/2014 | Pierson ................... H02M 1/14 323/272 |
| 9,356,510 | B2 | 5/2016 | Lijie |
| 9,473,027 | B2 | 10/2016 | Yan |
| 9,520,778 | B2 | 12/2016 | Lijie |
| 10,348,197 | B2 | 7/2019 | Chao |
| 10,498,234 | B2 | 12/2019 | Chao |
| 10,673,336 | B2 | 6/2020 | Lijie |
| 10,756,621 | B2 | 8/2020 | Binci |
| 10,951,116 | B2 | 3/2021 | Chao |
| 11,043,896 | B1 | 6/2021 | Ting |

* cited by examiner

*Primary Examiner* — Gary L Laxton
(74) *Attorney, Agent, or Firm* — Perkins Coie LLP

(57) ABSTRACT

A control circuit for a DC-DC converter has an adaptive voltage position (AVP) control circuit and a switching control circuit. The AVP control circuit generates a position signal based on an output voltage, an output current, a voltage identification code and a set of adaptive voltage control commands. The switching control circuit generates a switching control signal based on the position signal to control the DC-DC converter. When the output current is smaller than a current threshold, the control circuit chooses one of a first voltage position curve and a second voltage position curve as a load line according to the set of adaptive voltage control commands, and when the output current is larger than the current threshold, the control circuit chooses the remaining voltage position curve as the load line according to the set of adaptive voltage control commands.

20 Claims, 14 Drawing Sheets

| LL | Set1 | Set2 | Set |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

| LL | Set1 | Set2 | Set3 | SET |
|---|---|---|---|---|
| 00 | 0 | 0 | 0 | 0 |
| 00 | 0 | 0 | 1 | 1 |
| 00 | 0 | 1 | 0 | 1 |
| 00 | 0 | 1 | 1 | 1 |
| 00 | 1 | 0 | 0 | 1 |
| 00 | 1 | 0 | 1 | 1 |
| 00 | 1 | 1 | 0 | 1 |
| 00 | 1 | 1 | 1 | 1 |
| 01 | 0 | 0 | 0 | 0 |
| 01 | 0 | 0 | 1 | 0 |
| 01 | 0 | 1 | 0 | 0 |
| 01 | 0 | 1 | 1 | 1 |
| 01 | 1 | 0 | 0 | 0 |
| 01 | 1 | 0 | 1 | 1 |
| 01 | 1 | 1 | 0 | 0 |
| 01 | 1 | 1 | 1 | 1 |
| 10 | 0 | 0 | 0 | 0 |
| 10 | 0 | 0 | 1 | 0 |
| 10 | 0 | 1 | 0 | 0 |
| 10 | 0 | 1 | 1 | 0 |
| 10 | 1 | 0 | 0 | 0 |
| 10 | 1 | 0 | 1 | 1 |
| 10 | 1 | 1 | 0 | 1 |
| 10 | 1 | 1 | 1 | 1 |
| 11 | 0 | 0 | 0 | 0 |
| 11 | 0 | 0 | 1 | 0 |
| 11 | 0 | 1 | 0 | 0 |
| 11 | 0 | 1 | 1 | 0 |
| 11 | 1 | 0 | 0 | 0 |
| 11 | 1 | 0 | 1 | 0 |
| 11 | 1 | 1 | 0 | 0 |
| 11 | 1 | 1 | 1 | 1 |

FIG.14

CONTROL CIRCUIT FOR DC-DC CONVERTERS WITH NONLINEAR ADAPTIVE VOLTAGE POSITION AND CONTROL METHOD THEREOF

CROSS-REFERENCE TO RELATED APPLICATIONS

This application claims the benefit of CN application 202111284124.3, filed on Nov. 1, 2021, and incorporated herein by reference.

TECHNICAL FIELD

The present invention generally relates to electronic circuits, and more particularly, relates to adaptive voltage position (AVP) control circuits for DC-DC converters and control methods thereof.

BACKGROUND

In power supplies for microprocessors with high current and low voltage, the power performance, especially the transient response is vital. Adaptive voltage position (AVP) control is widely used to reduce voltage deviations of the output voltage (i.e., the power supply of microprocessors) during the load step to insure the system stability.

The basic principle of traditional AVP control is shown in FIG. 1. An output voltage Vo decreases linearly from a voltage V1 to a voltage V2, as an output current Io (i.e. load current) increases from a minimum value (e.g., from zero) to a maximum load point Imax, wherein V1 may be a reference voltage set according to a voltage identification code (VID) from a processor load.

With fast development of the microprocessor, power supplies with higher voltage levels are needed. The output voltage at full load may be very low, which may be close to a lowest threshold of the CPU operational voltage, if traditional AVP control is adopted. Thus, an improved voltage regulator with better output voltage control is in high demand.

SUMMARY

Embodiments of the present invention are directed to a control circuit for a DC-DC converter, comprising an adaptive voltage position (AVP) control circuit and a switching control circuit. The DC-DC converter comprises at least one switch, and is configured to receive an input voltage and to provide an output voltage and an output current. The AVP control circuit is configured to provide a position signal based on the output voltage, the output current, a voltage identification code and a set of adaptive voltage control commands, wherein the set of adaptive voltage control commands comprises a load line data. The switching control circuit is configured to provide a switching control signal based on the position signal to control the at least one switch of the DC-DC converter. When the output current is smaller than a first current threshold, the control circuit is configured to choose one of a first voltage position curve, a second voltage position curve, and a third voltage position curve as a load line of the output voltage versus the output current according to the load line data, wherein each of the first voltage position curve, the second voltage position curve, and the third voltage position curve is a curve of the output voltage against the output current with a slope. When the output current is larger than the first current threshold and smaller than a second current threshold, the control circuit is configured to choose one of the remaining two voltage position curves as the load line according to the load line data. And when the output current is larger than the second current threshold, the control circuit is configured to choose the remaining voltage position curve as the load line according to the load line data. The control circuit is further configured to control the output voltage to vary along the load line as the output current varies.

Embodiments of the present invention are also directed to a control circuit for a DC-DC converter, comprising an adaptive voltage position (AVP) control circuit and a switching control circuit. The DC-DC converter comprises at least one switch, and is configured to receive an input voltage and provide an output voltage and an output current. The AVP control circuit is configured to provide a position signal based on the output voltage, the output current, a voltage identification code, and a set of adaptive voltage control commands. The switching control circuit is configured to provide a switching control signal based on the position signal to control the at least one switch of the DC-DC converter. When the output current is smaller than a current threshold, the control circuit is configured to choose one of a first voltage position curve and a second voltage position curve as a load line of the output voltage versus the output current according to the set of adaptive voltage control commands, and when the output current is larger than the current threshold, the control circuit is configured to choose the remaining voltage position curve as the load line according to the set of adaptive voltage control commands, and the control circuit is further configured to control the output voltage to vary along the load line as the output current varies.

Embodiments of the present invention are further directed to an adaptive voltage position (AVP) control method for a DC-DC converter. The DC-DC converter comprises at least one switch, and is configured to receive an input voltage and provide an output voltage and an output current. The AVP control method comprises receiving a set of adaptive voltage control commands and a voltage identification code, generating a position signal based on the output voltage and the output current, the voltage identification code and the set of adaptive voltage control commands, providing a switching control signal based on the position signal to control at least one switch of the DC-DC converter. Wherein when the output current is smaller than a first current threshold, choosing one of a plurality of voltage position curves as a load line of the output voltage versus the output current according to the set of adaptive voltage control commands, and when the output current is larger than the first current threshold, choosing one of the remaining of the plurality of voltage position curves as the load line according to the set of adaptive voltage control commands, and further controlling the output voltage to vary along the load line as the output current varies. And wherein the plurality of voltage position curves comprise a first voltage position curve and a second voltage position curve.

These and other features of the present invention will be readily apparent to persons of ordinary skill in the art upon reading the entirety of this disclosure, which includes the accompanying drawings and claims.

BRIEF DESCRIPTION OF THE DRAWING

The present invention can be further understood with reference to the following detailed description and the appended drawings, wherein like elements are provided with like reference numerals.

FIG. 14 schematically shows a truth table of a logic circuit 600 of the position signal generator 73 in accordance with an embodiment of the present invention.

DETAILED DESCRIPTION

Figure 1:
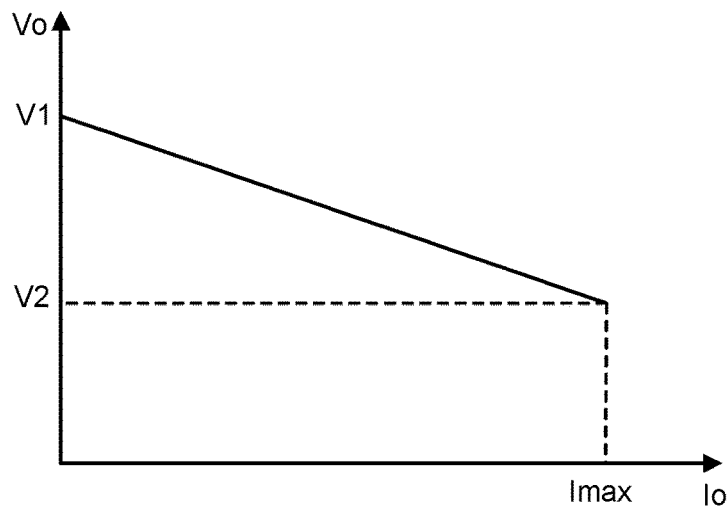
FIG. 1 schematically shows a basic principle of traditional adaptive voltage position (AVP) control.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The control circuit for a DC-DC converter illustrated in the embodiments comprises an adaptive voltage position (AVP) control circuit and a switching control circuit. The AVP control circuit receives a voltage identification code and a set of adaptive voltage control commands, and generates a position signal based on an output voltage and an output current under the control of the voltage identification code and the set of adaptive voltage control commands. The switching control circuit generates a switching control signal based on the position signal to control at least one switch of the DC-DC converter. Within different sections of the output current, the control circuit chooses different voltage position curves as a load line of the output voltage versus the output current according to the set of adaptive voltage control commands. In other words, when the output current is smaller than a first current threshold, the control circuit chooses one of a plurality of voltage position curves as the load line, and when the output current is larger than the first current threshold, the control circuit chooses one of the remaining of the plurality of voltage position curves as the load line. For example, when the output current is smaller than the first current threshold, the control circuit chooses one of a first voltage position curve and a second voltage position curve as the load line, and when the output current is larger than the first current threshold, the control circuit chooses the remaining voltage position curve as the load line. In another example, when the output current is smaller than the first current threshold, the control circuit chooses one of the first voltage position curve, the second voltage position curve, and a third voltage position curve as the load line, when the output current is larger than the first current threshold and smaller than a second current threshold, the control circuit chooses one of the remaining two voltage position curves as the load line, and when the output current is larger than the second current threshold, the control circuit chooses the remaining voltage position curve as the load line. Wherein each of the first voltage position curve, the second voltage position curve and the third voltage position curve is a curve of the output voltage against the output current with a slope. Thus, the control circuit controls the output voltage to vary nonlinearly along the load line as the output current varies. The control circuit can provide any kind of nonlinear load line to meet different requirements of the load.

Figure 2:
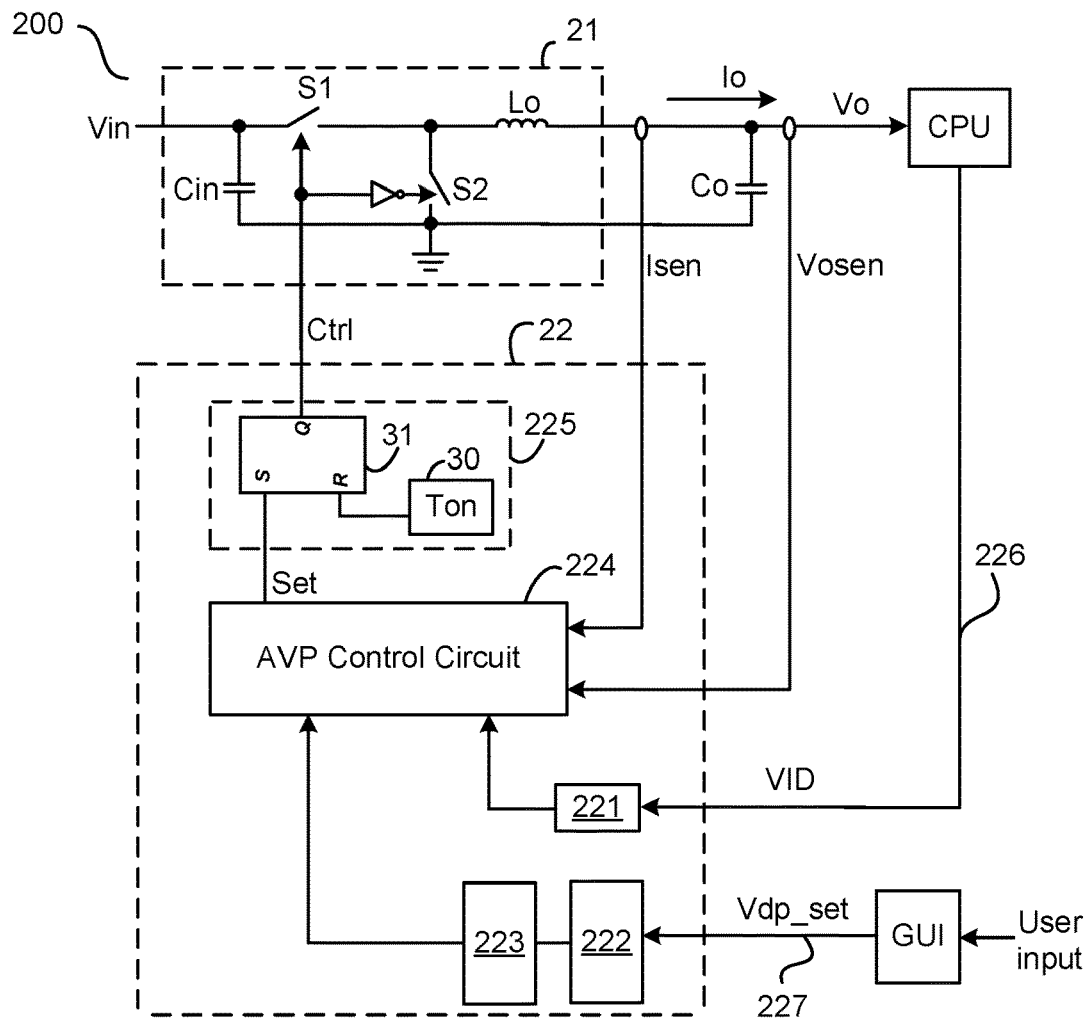
FIG. 2 schematically shows a DC-DC converter 200 in accordance with an embodiment of the present invention.

FIG. 2 schematically shows a DC-DC converter 200 in accordance with an embodiment of the present invention. In the example of FIG. 2, DC-DC converter 200 comprises a switching circuit 21 and a control circuit 22. Switching circuit 21 is configured to receive an input voltage Vin, and is configured to provide an output voltage Vo and an output current Io to a load. An output capacitor Co is coupled between an output terminal of switching circuit 21 and a ground. For example, the load may comprise but not be limited to central processing unit (CPU), graphics processing unit (GPU), etc. Control circuit 22 is configured to receive a voltage identification code VID provided by the load to determine output voltage Vo and a set of adaptive voltage control commands Vdp_set to determine features of the load line, and is configured to generate a switching control signal Ctrl to control at least one switch of switching circuit 21 based on an output voltage sense signal Vosen representative of output voltage Vo, an output current sense signal Isen representative of output current Io, the voltage identification code VID and the set of adaptive voltage control commands Vdp_set. Thus, output voltage Vo varies nonlinearly as output current Io varies under the control of set of adaptive voltage control commands Vdp_set. Controlled by set of adaptive voltage control commands Vdp_set, DC-DC converter 200 may have a nonlinear load line of any kind to meet different requirements of the load. Generally, the load line represents a voltage droop of output voltage Vo with increasing of output current Io. Switching circuit 21 may comprise a single-phase or multi-phase circuit topology, such as buck, boost or buck-boost circuit, etc. In the example of FIG. 2, switching circuit 21 is a single-phase buck circuit for illustration. In the example of FIG. 2, switching circuit 21 comprises a switch S1, a switch S2, an output inductor Lo and an input capacitor Cin. A first terminal of switch S1 is coupled to an input terminal of switching circuit 21 to receive input voltage Vin. A first terminal of switch S2 is coupled to a second terminal of switch S1, and a second terminal of switch S2 is coupled to the ground. Switch S1 and switch S2 are turned ON and OFF complementarily under the control of switching control signal Ctrl. Output inductor Lo has a first terminal coupled to the second terminal of switch S1 and the first terminal of switch S2, and has a second terminal coupled to the output terminal to provide output voltage Vo. Input capacitor Cin is between the input terminal and the ground. In one embodiment, output current sense signal Isen represents a current flowing through output inductor Lo. In one embodiment, voltage sense signal Vosen is a differential voltage.

In one embodiment, control circuit 22 comprises a communication interface circuit 221, a communication interface circuit 222, a memory 223, an AVP control circuit 224, and a switching control circuit 225. Communication interface circuit 221 receives voltage identification code VID sent by the load through a communication bus 226. Voltage identification code VID is received to provide a reference voltage Vref1 to DC-DC converter 200. In one example, communication bus 226 comprises a parallel voltage identification (PVID) bus, a serial voltage identification (SVID) bus and an adaptive voltage scaling bus (AVSBus), etc. In one example, interface circuit 221 comprises a PVID interface circuit, an SVID interface circuit and an AVSBus interface circuit, etc. Interface circuit 222 receives set of adaptive voltage control commands Vdp_set through a communication bus 227. Set of adaptive voltage control commands Vdp_set may be written in by users through a graphical user interface (GUI), or provided by a system controller. In one example, communication bus 227 may comprise a power management bus (PMBus), a system management bus (SMBus), a bidirectional synchronous serial bus I2C, etc., and communication interface circuit 222 may comprise a PMBus interface circuit, an SMBus interface circuit, and I2C interface circuit, etc. Memory 223 is configured to save set of adaptive voltage control commands Vdp_set received through communication interface circuit 222.

In one embodiment, set of adaptive voltage control commands Vdp_set comprises a load line data LL. Within different sections of the output current, control circuit 22 chooses different voltage position curves as the load line according to load line data LL, to control output voltage Vo to vary nonlinearly along the load line as output current Io varies. In one embodiment, the load line comprises a first voltage position curve and a second voltage position curve. In one embodiment, set of adaptive voltage control commands Vdp_set further comprises a voltage position resistance data DRP1 to control a slope of the first voltage position curve, a voltage offset data OFFSET2 to participate in controlling an offset of the second voltage position curve, and a voltage position resistance data DRP2 to control a slope of the second voltage position curve. An offset of the first voltage position curve is controlled by voltage identification code VID, and the offset of the second voltage position curve is controlled by voltage identification code VID and voltage offset data OFFSET2. In one embodiment, the load line further comprises a third voltage position curve, and set of adaptive voltage control commands Vdp_set further comprises a voltage offset data OFFSET3 to participate in controlling an offset of the third voltage position curve and a voltage position resistance data DRP3 to control a slope of the third voltage position curve, wherein the offset of the third voltage position curve is controlled by voltage identification code VID and voltage offset data OFFSET3.

AVP control circuit 224 receives voltage identification code VID and set of adaptive voltage control commands Vdp_set, and generates a position signal Set based on output voltage Vo and output current Io under the control of voltage identification code VID and set of adaptive voltage control commands Vdp_set. Switching control circuit 225 generates switching control signal Ctrl based on position signal Set to control the at least one switch of DC-DC converter 200. In the example of FIG. 2, switching control circuit 225 employs constant ON time control for illustration. For example, switching control circuit 225 comprises an RS flip-flop 31 and an ON time control circuit 30. When position signal Set becomes active, RS flip-flop 31 is set, switch S1 is turned ON and switch S2 is turned OFF by switching control signal Ctrl. Until the ON time period of switch S1 reaches a time period predetermined by ON time control circuit 30, RS flip-flop 31 is reset, switch S1 is turned OFF and switch S1 is turned ON by switching control signal Ctrl. One with ordinary skill in the art should understand that the detailed circuit structure of switching control circuit 225 is not limited by the example shown in FIG. 2, and switching control circuit 225 may also comprise any other suitable control methods and circuit topologies.

Figure 3A:
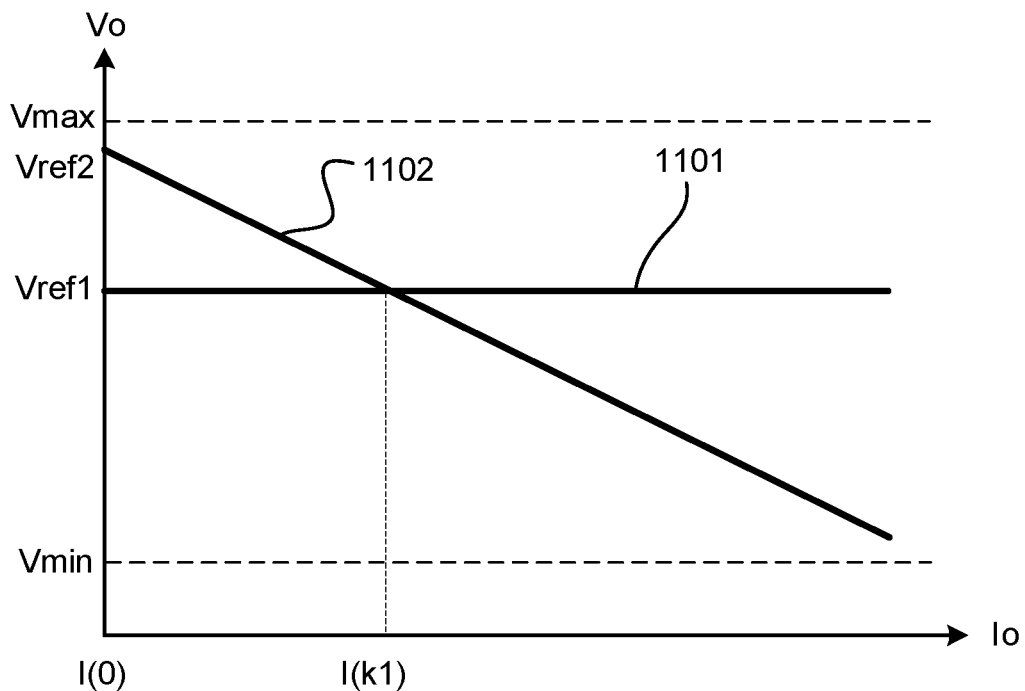
FIG. 3A-3E show plots of two-stage voltage position control in accordance with an embodiment of the present invention.

FIG. 3A-3E show plots of two-stage voltage position control in accordance with embodiments of the present invention. FIG. 3A shows voltage position curves 1101-1102 in accordance with an embodiment of the present invention. In one embodiment, voltage position curve 1101 is generated based on voltage identification code VID and voltage position resistance data DRP1. Voltage identification code VID is configured to control an offset of voltage position curve 1101, and voltage position resistance data DRP1 is configured to control a slope of voltage position curve 1101. The offset of voltage position curve 1101 equals the level of output voltage Vo when output current Io is zero, i.e., reference voltage Vref1. Voltage position resistance data DRP1 determines the resistance of voltage position resistor Rdroop1, and thus controls the slope of voltage position curve 1101. In one embodiment, voltage position curve 1102 is generated based on voltage identification code VID, voltage offset data OFFSET2 and voltage position resistance data DRP2. Voltage identification code VID and voltage offset data OFFSET2 are configured to control an offset of voltage position curve 1102, and voltage position resistance data DRP2 is configured to control a slope of voltage position curve 1102. The offset of voltage position curve 1102 equals the level of output voltage Vo when output current Io is zero, i.e., a reference voltage Vref2. Voltage position resistance data DRP2 determines the resistance of voltage position resistor Rdroop2, and thus controls the slope of voltage position curve 1102. In the example of FIG. 3A, the resistance of voltage position resistor Rdroop1 controlled by voltage position resistance data DRP1 is zero, as a result, the slope of voltage position curve 1101 is zero. Voltage offset data OFFSET2 corresponds to a positive voltage offset, and reference voltage Vref2 is higher than reference voltage Vref1. The resistance of voltage position resistor Rdroop2 controlled by voltage position resistance data DRP2 is larger than the resistance of voltage position resistor Rdroop1 controlled by voltage position resistance data DRP1.

In one embodiment, within different sections of output current Io, control circuit 22 chooses different voltage position curves as the load line, and thus controls output voltage Vo to vary between a maximum output voltage Vmax and a minimum output voltage Vmin along the load line as output current Io varies.

Figure 3B:
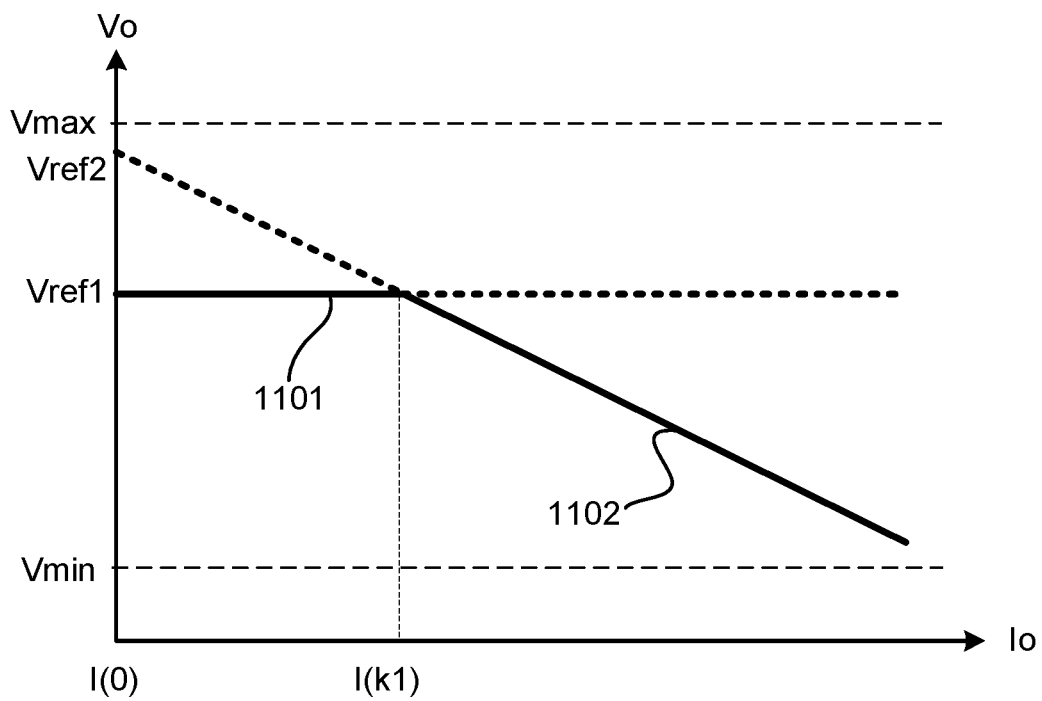
Figure 3C:
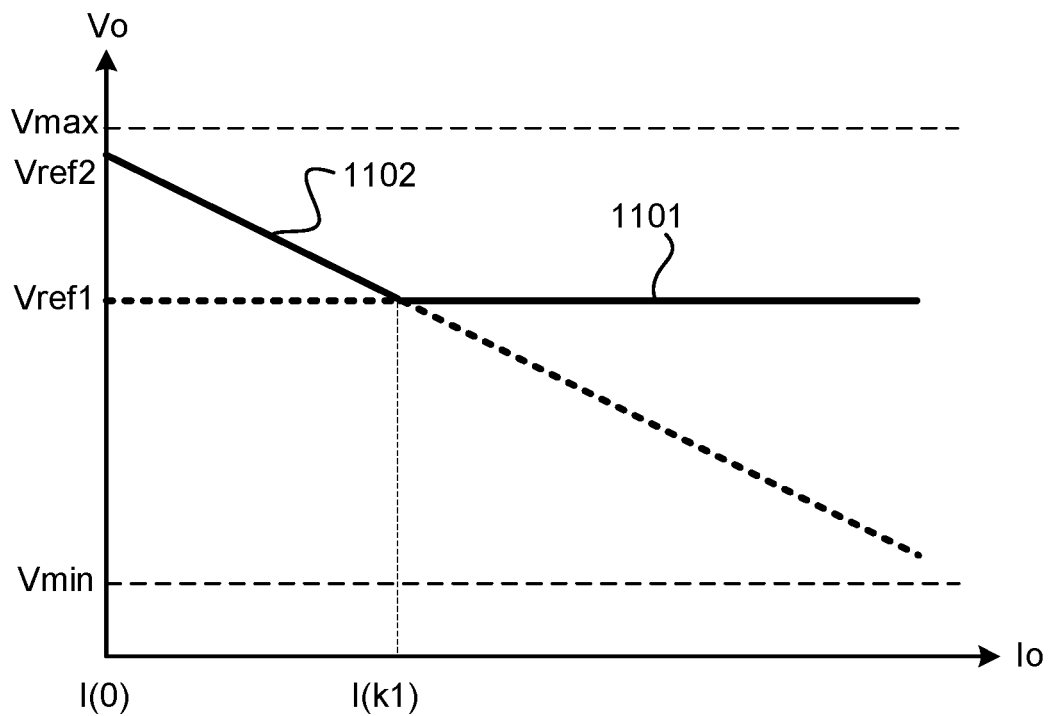
Figure 3D:
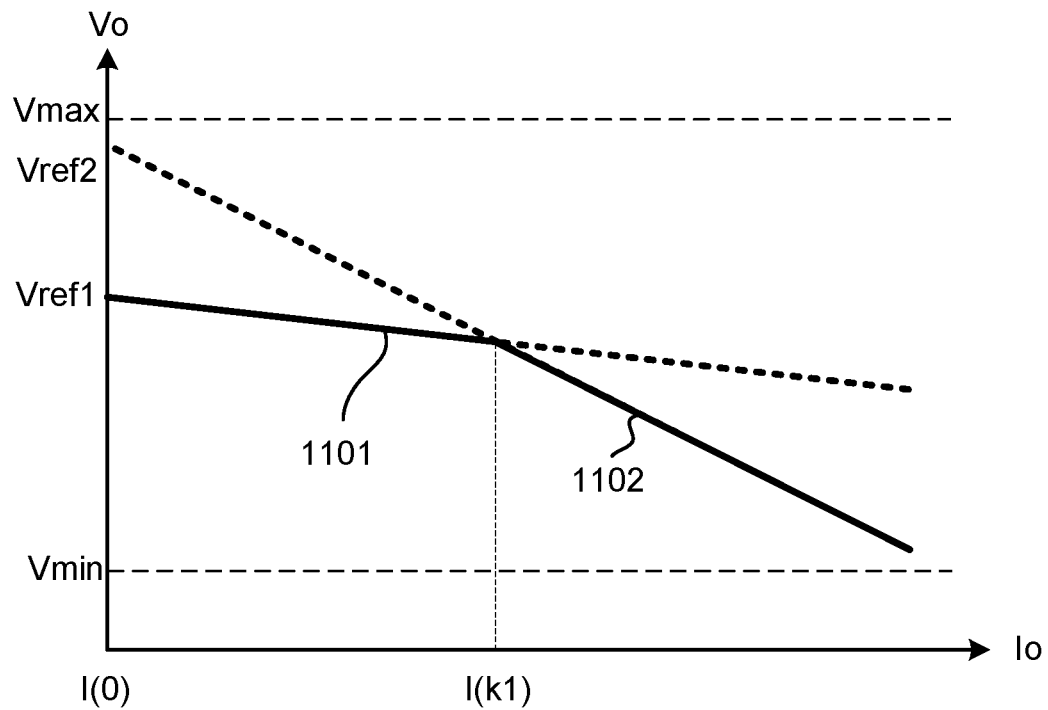
Figure 3E:
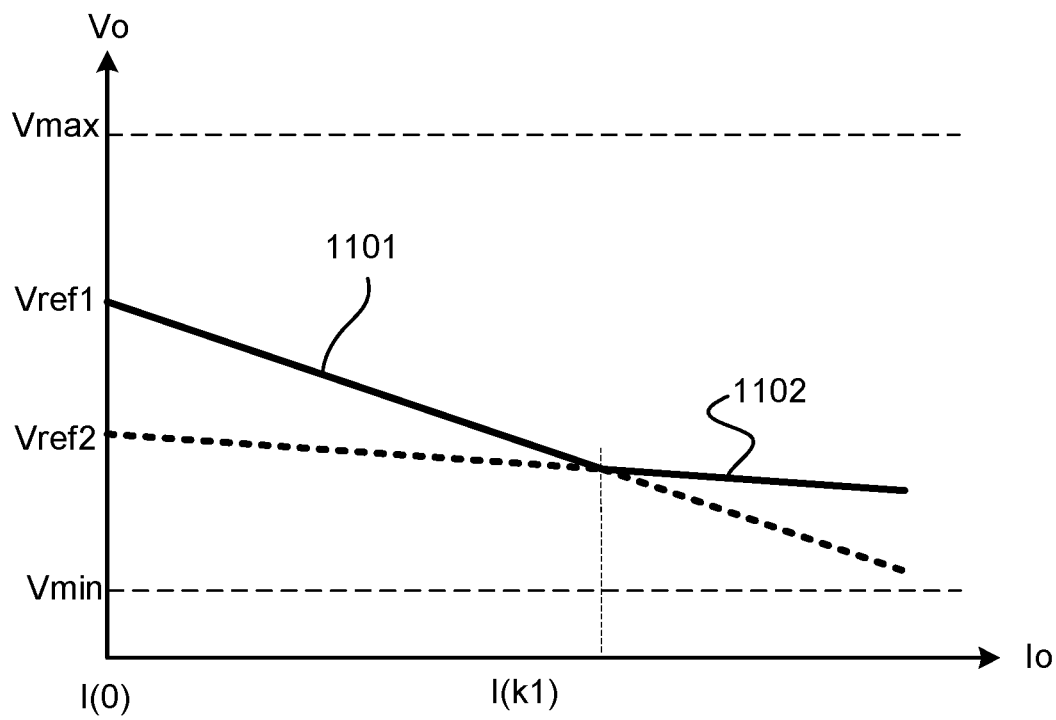

FIG. 3B shows a plot of load line comprising two voltage position curves in accordance with an embodiment of the present invention. In the example of FIG. 3B, under the control of load line data LL, voltage position curve 1101 is used as the load line when output current Io is smaller than a current threshold I(k1), and voltage position curve 1102 is used as the load line when output current Io is larger than current threshold I(k1). Current threshold I(k1) equals output current Io at the intersection of voltage position curve 1101 and voltage position curve 1102. In one embodiment, current threshold I(k1) changes with voltage position curves 1101-1102. One with ordinary skill in the art should understand that voltage position curves 1101-1102 are not limited by the example shown in FIG. 3B, but may also have any different offset and slope under the control of set of adaptive voltage control commands Vdp_set. FIG. 3C shows the plot of load line comprising two voltage position curves in accordance with another embodiment of the present invention. In the example of FIG. 3C, under the control of load line data LL, voltage position curve 1102 is used as the load line when output current Io is smaller than current threshold I(k1), and voltage position curve 1101 is used as the load line when output current Io is larger than current threshold I(k1). FIG. 3D shows a plot of load line comprising two voltage position curves in accordance with another embodiment of the present invention. In the example of FIG. 3D, voltage offset data OFFSET2 corresponds to a positive voltage offset, and reference voltage Vref2 is larger than reference voltage Vref1. The resistance of voltage position resistor Rdroop2 controlled by voltage position resistance data DRP2 is larger than the resistance of voltage position resistor Rdroop1 controlled by voltage position resistance data DRP1, and thus the slope of voltage position curve 1102 is larger than the slope of voltage position curve 1101. FIG. 3E shows a plot of load line comprising two voltage position curves in accordance with another embodiment of the present invention. In the example of FIG. 3E, voltage offset data OFFSET2 corresponds to a negative voltage offset and reference voltage Vref2 is smaller than reference voltage Vref1. The resistance of voltage position resistor Rdroop2 controlled by voltage position resistance data DRP2 is smaller than the resistance of voltage position resistor Rdroop1 controlled by voltage position resistance data DRP1, and thus the slope of voltage position curve 1102 is smaller than the slope of voltage position curve 1101.

Figure 4A:
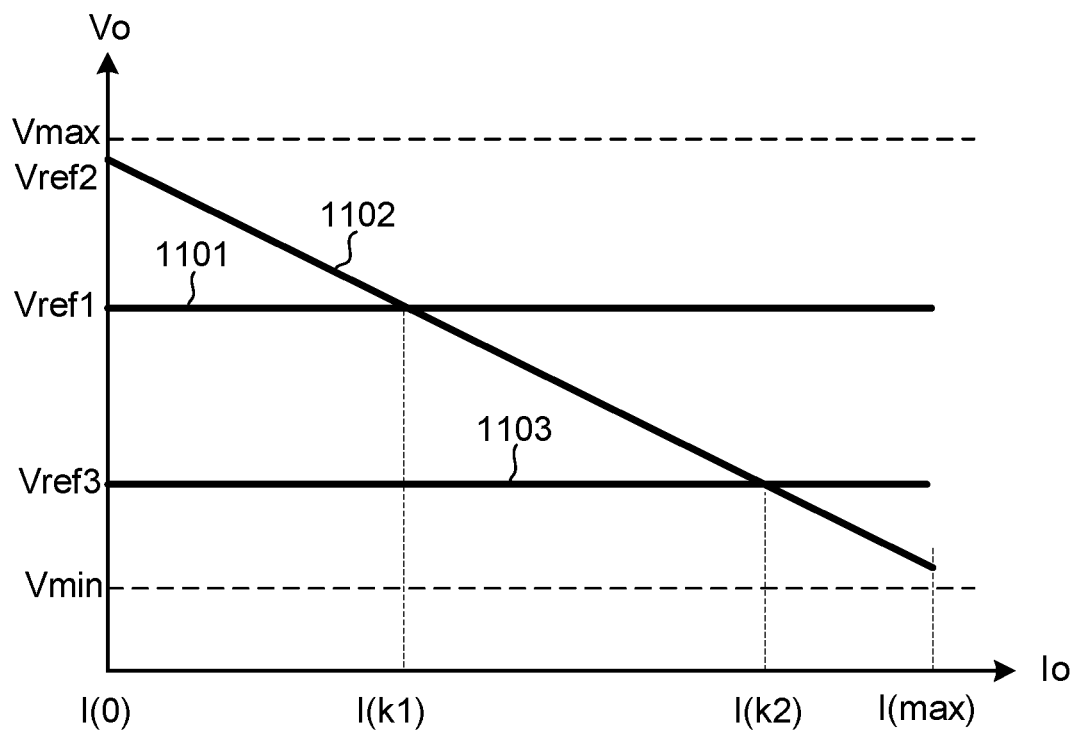
FIG. 4A-4D show plots of three-stage voltage position control in accordance with an embodiment of the present invention.

FIG. 4A-4D show plots of three-stage voltage position control in accordance with embodiments of the present invention. FIG. 4A shows voltage position curves 1101-1103 in accordance with an embodiment of the present invention. Compared with FIG. 3A, FIG. 4A further shows a voltage position curve 1103. In one embodiment, voltage position curve 1103 is generated based on voltage identification code VID, voltage offset data OFFSET3 and voltage position resistance data DRP3. Voltage identification code VID and voltage offset data OFFSET3 are configured to control an offset of voltage position curve 1103, and voltage position resistance data DRP3 is configured to control a slope of voltage position curve 1103. The offset of voltage position curve 1103 equals the level of output voltage Vo when output current Io is zero, i.e., a reference voltage Vref3. Voltage position resistance data DRP3 determines the resistance of voltage position resistor Rdroop3, and thus controls the slope of voltage position curve 1103.

Figure 4B:
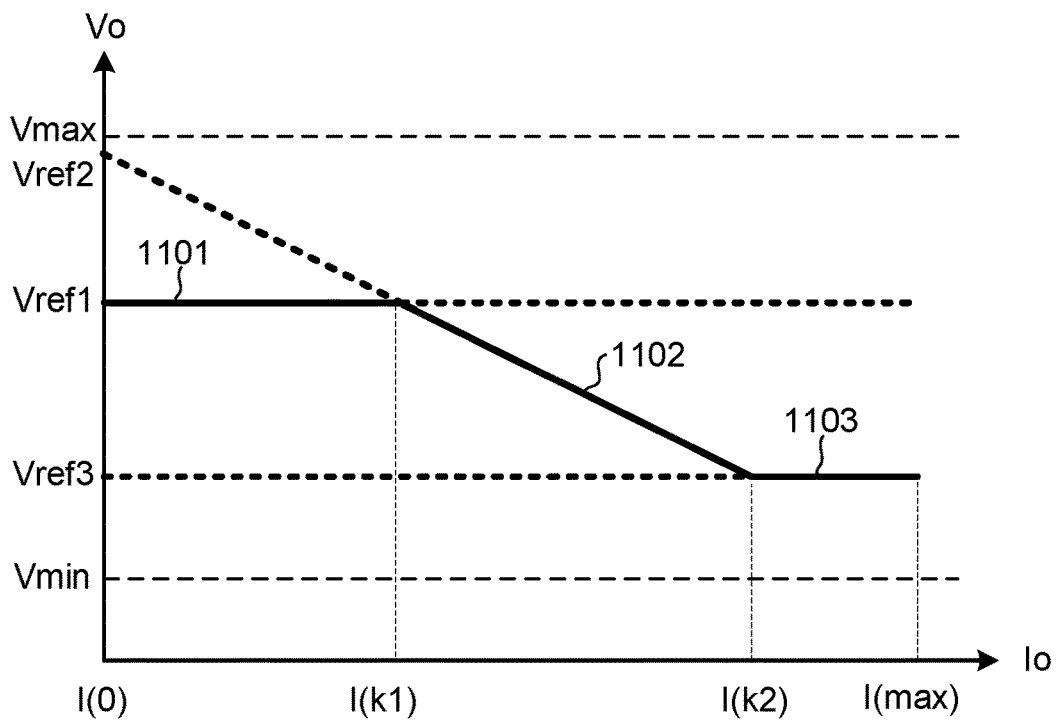

FIG. 4B shows a plot of load line comprising three voltage position curves in accordance with an embodiment of the present invention. In the example of FIG. 4B, reference voltage Vref2 is larger than reference voltage Vref1, reference voltage Vref1 is larger than reference voltage Vref3, the resistance of voltage position resistor Rdroop2 controlled by voltage position resistance data DRP2 is larger than the resistance of voltage position resistor Rdroop3 controlled by voltage position resistance data DRP3, and the resistance of voltage position resistor Rdroop3 controlled by voltage position resistance data DRP3 equals the resistance of voltage position resistor Rdroop1 controlled by voltage position resistance data DRP1. In the example of FIG. 4B, when output current Io is smaller than current threshold I(k1), voltage position curve 1101 is chosen as the load line by control circuit 22 according to load line data LL. When output current Io is larger than current threshold I(k1) and smaller than a current threshold I(k2), voltage position curve 1102 is chosen as the load line by control circuit 22 according to load line data LL. When output current Io is larger than current threshold I(k2), voltage position curve 1103 is chosen as the load line by control circuit 22 according to load line data LL. Current threshold I(k2) equals output current Io at the intersection of voltage position curve 1102 and voltage position curve 1103. In one embodiment, current threshold I(k2) changes with voltage position curves 1102-1103. One with ordinary skill in the art should understand that voltage position curves 1101-1103 are not limited by the example shown in FIG. 4B, but may also have any different offset and slope under the control of set of adaptive voltage control commands Vdp_set. One with ordinary skill in the art should understand that in different sections of output current Io, control circuit 22 may also choose voltage position curves different from the example shown in FIG. 4B to meet different requirements of the load.

Figure 4C:
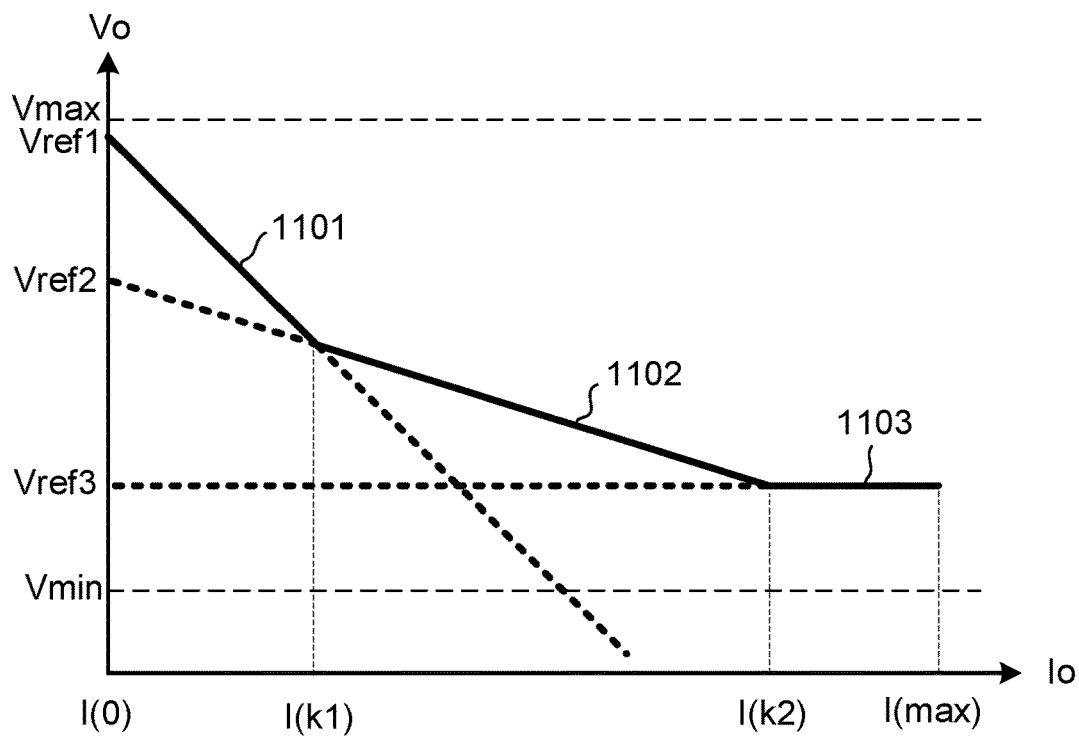
Figure 4D:
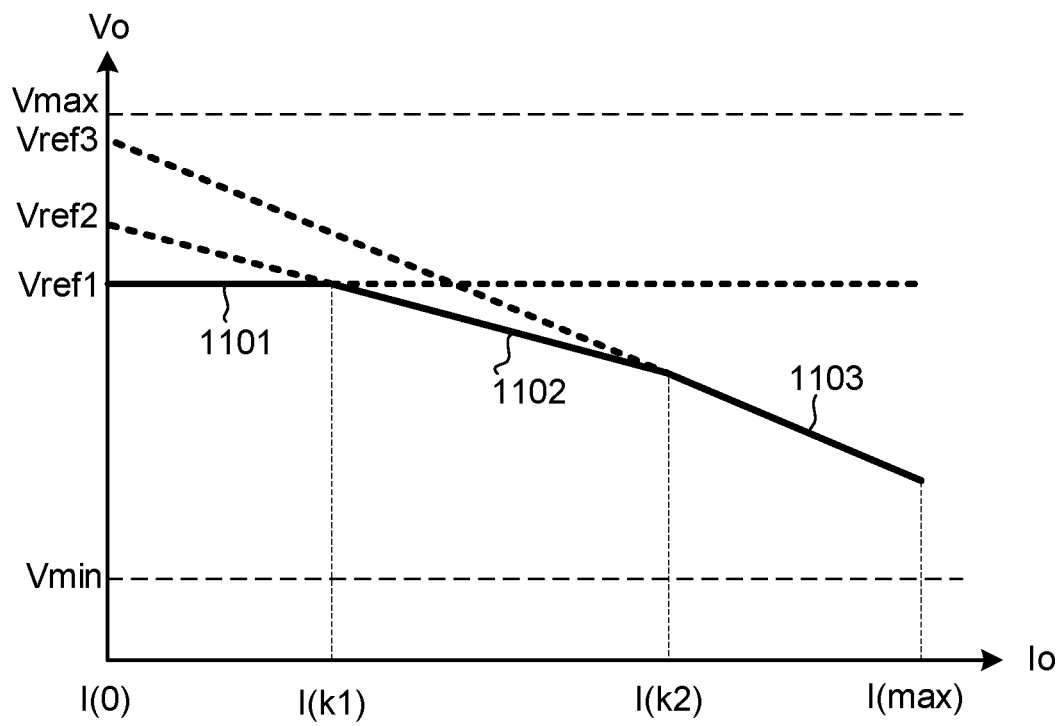

FIG. 4C shows a plot of load line comprising three voltage position curves in accordance with another embodiment of the present invention. In the example of FIG. 4C, reference voltage Vref1 is larger than reference voltage Vref2, reference voltage Vref2 is larger than reference voltage Vref3, the resistance of voltage position resistor Rdroop1 controlled by voltage position resistance data DRP1 is larger than the resistance of voltage position resistor Rdroop2 controlled by voltage position resistance data DRP2, and the resistance of voltage position resistor Rdroop2 controlled by voltage position resistance data DRP2 is larger than the resistance of voltage position resistor Rdroop3 controlled by voltage position resistance data DRP3. FIG. 4D shows a plot of load line comprising three voltage position curves in accordance with another embodiment of the present invention. In the example of FIG. 4D, reference voltage Vref3 is larger than reference voltage Vref2, reference voltage Vref2 is larger than reference voltage Vref1, the resistance of voltage position resistor Rdroop1 controlled by voltage position resistance data DRP1 is smaller than the resistance of voltage position resistor Rdroop2 controlled by voltage position resistance data DRP2, and the resistance of voltage position resistor Rdroop2 controlled by voltage position resistance data DRP2 is smaller than the resistance of voltage position resistor Rdroop3 controlled by voltage position resistance data DRP3.

One with ordinary skill in the art should understand that the load line and the voltage position curves included in which are not limited by the examples shown in FIG. 3-FIG. 4. Users may also design load lines comprising any number of voltage position curves and voltage position curves with any offset and slope via set of adaptive voltage control commands Vdp_set. Within different sections of output current Io, users may also choose different voltage position curves as the load line according to load line data LL to meet different requirements of the load, without changing the hardware of DC-DC converter 200.

Figure 5:
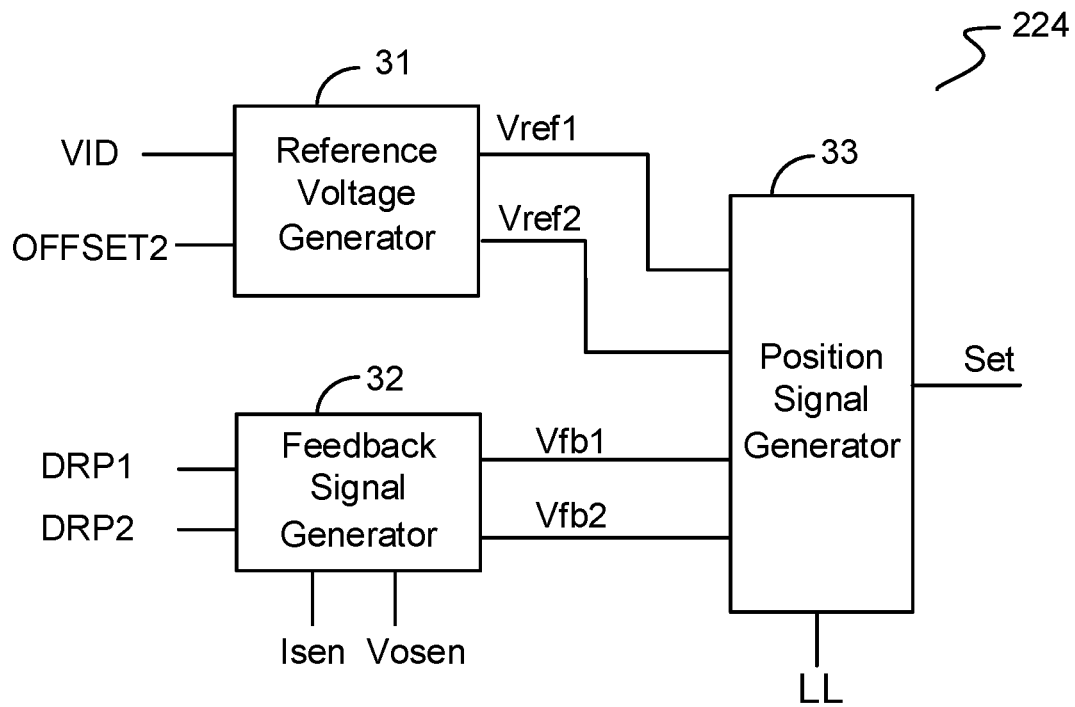
FIG. 5 schematically shows an AVP control circuit 224 in accordance with an embodiment of the present invention.

FIG. 5 schematically shows an AVP control circuit 224 in accordance with an embodiment of the present invention. The embodiment of FIG. 5 employs two-stage voltage position control as an example.

In the example of FIG. 5, AVP control circuit 224 comprises a reference voltage generator 31, a feedback signal generator 32 and a position signal generator 33. Reference voltage generator 31 generates reference voltage Vref1 and reference voltage Vref2 based on voltage identification code VID and voltage offset data OFFSET2. In one embodiment, reference voltage generator 31 generates reference voltage Vref1 based on voltage identification code VID, and generates reference voltage Vref2 based on voltage identification code VID and voltage offset data OFFSET2, so that reference voltage Vref2 equals the sum of reference voltage Vref1 and an offset voltage Voff2 (Vref1+Voff2), wherein offset voltage Voff2 is controlled by voltage offset data OFFSET2. In one embodiment, voltage offset data OFFSET2 may be positive, zero, or negative. Accordingly, offset voltage Voff2 may be positive, zero, or negative. In one embodiment, feedback signal generator 32 generates a feedback signal Vfb1 and a feedback signal Vfb2 based on output voltage sense signal Vosen and output current sense signal Isen under the control of voltage position resistance data DRP1 and voltage position resistance data DRP2. In one embodiment, position signal generator 33 generates position signal Set based on reference voltage Vref1, reference voltage Vref2, feedback signal Vfb1, feedback signal Vfb2 and load line data LL. For example, position signal generator 33 generates position signal Set based on a comparison signal Set1 generated by comparing reference voltage Vref1 with feedback signal Vfb1, a comparison signal Set2 generated by comparing reference voltage Vref2 with feedback signal Vfb2, and load line data LL.

Figure 6:
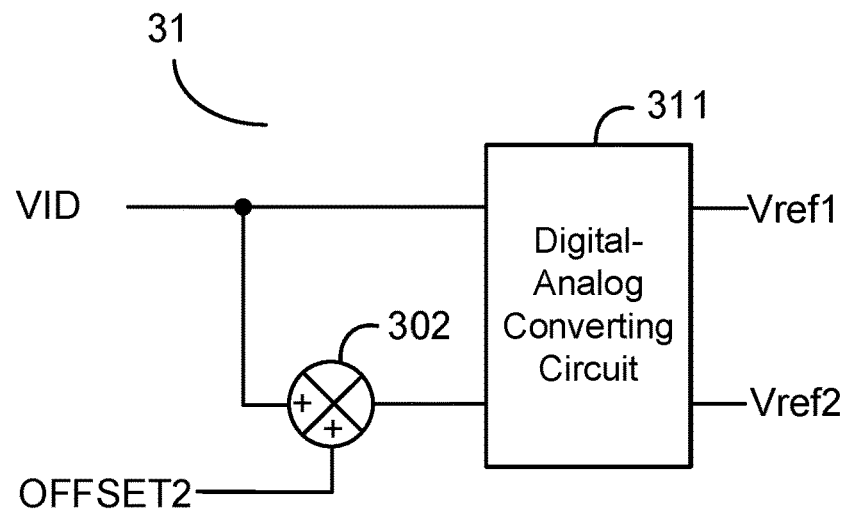
FIG. 6 schematically shows a reference voltage generator 31 in accordance with an embodiment of the present invention.

FIG. 6 schematically shows reference voltage generator 31 in accordance with an embodiment of the present invention. In the example of FIG. 6, reference voltage generator 31 comprises an operational circuit 302 and a digital-analog converting circuit 311. Operational circuit 302 receives voltage identification code VID and voltage offset data OFFSET2, and sends the sum of voltage identification code VID and voltage offset data OFFSET2 (VID+OFFSET2) to digital-analog converting circuit 311. Digital-analog converting circuit 311 generates reference voltage Vref1 based on voltage identification code VID, and generates reference voltage Vref2 based on the sum of voltage identification code VID and voltage offset data OFFSET2 (VID+OFFSET2).

Figure 7:
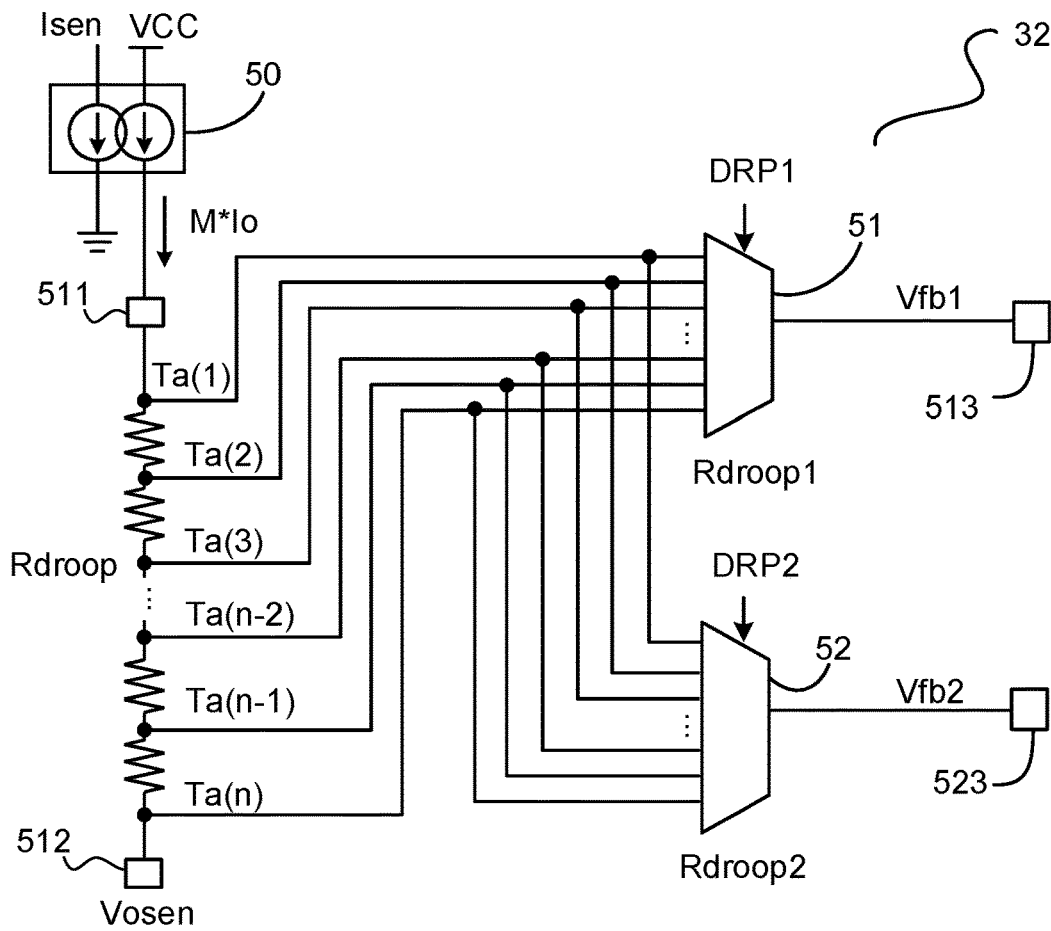
FIG. 7 schematically shows a feedback signal generator 32 in accordance with an embodiment of the present invention.

FIG. 7 schematically shows a feedback signal generator 32 in accordance with an embodiment of the present invention. In the example of FIG. 7, feedback signal generator 32 comprises a current mirror 50, a voltage position resistor Rdroop, a multiplexer 51 and a multiplexer 52. Current mirror 50 generates a mirror current M*Io which is proportional to the output current based on output current sense signal Isen, wherein the coefficient M is positive. Voltage position resistor Rdroop has a current sense terminal 511 and a voltage sense terminal 512. Current sense terminal 511 is coupled to current mirror 50 to receive mirror current M*Io, and voltage sense terminal 512 receives output voltage sense signal Vosen. Voltage position resistor Rdroop has a plurality of nodes Ta(1), Ta(2), . . . Ta(n), and each node corresponds to a voltage. Multiplexer 51 comprises a plurality of input terminals which are respectively coupled to the plurality of nodes of voltage position resistor Rdroop. Multiplexer 51 comprises an output terminal 513 to provide feedback signal Vfb1. Multiplexer 51 selects one of the plurality of nodes based on voltage position resistance data DRP1 to control the resistance of voltage position resistor Rdroop1 across output terminal 513 and voltage sense terminal 512, so as to provide feedback signal Vfb1. In one embodiment, feedback signal Vfb1 equals a sum of output voltage sense signal Vosen and a voltage drop generated by mirror current M*Io flowing through voltage position resistor Rdroop1. Feedback signal Vfb1 may be expressed by the following formula (1). Multiplexer 52 comprises a plurality of input terminals which are respectively coupled to the nodes of voltage position resistor Rdroop. Multiplexer 52 comprises an output terminal 523, configured to provide feedback signal Vfb2. Multiplexer 52 selects one node in the plurality of nodes based on voltage position resistance data DRP2 to control the resistance of voltage position resistor Rdroop2 across output terminal 523 and voltage sense terminal 512, so as to get feedback signal Vfb2. In one embodiment, feedback signal Vfb2 equals a sum of output voltage sense signal Vosen and the voltage drop generated by mirror current M*Io flowing through voltage position resistor Rdroop2. Feedback signal Vfb2 may be expressed by the following formula (2).

$$Vfb1 = Vosen + M*Io*Rdroop1 \qquad (1)$$

$$Vfb2 = Vosen + M*Io*Rdroop2 \qquad (2)$$

Figures 8, 9:
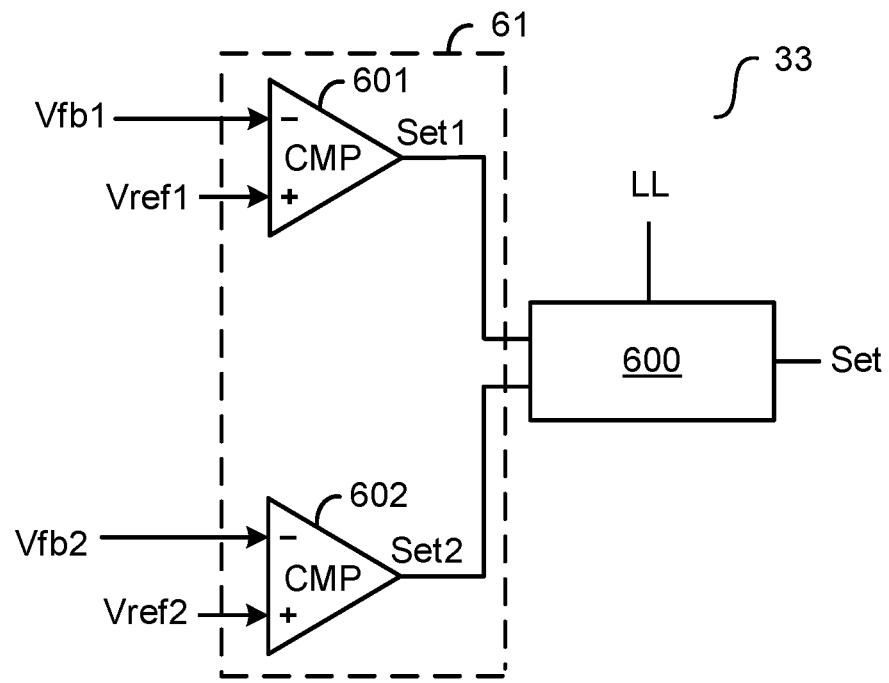
FIG. 8 schematically shows a position signal generator 33 in accordance with an embodiment of the present invention.
FIG. 9 schematically shows a truth table of a logic circuit 600 of the position signal generator 33 in accordance with an embodiment of the present invention.

FIG. 8 schematically shows position signal generator 33 in accordance with an embodiment of the present invention. In the example of FIG. 8, position signal generator 33 comprises a comparison circuit 61 and a logic circuit 600. In the example of FIG. 8, compare circuit 61 comprises a comparator 601 and a comparator 602. Comparator 601 has a non-inverting input terminal to receive reference voltage Vref1, an inverting input terminal to receive feedback signal Vfb1, and an output terminal to provide comparison signal Set1 by comparing reference voltage Vref1 with feedback signal Vfb1. When feedback signal Vfb1 is smaller than reference voltage Vref1, comparison signal Set1 becomes active (e.g. logic high). Comparator 602 has a non-inverting input terminal to receive reference voltage Vref2, an inverting input terminal to receive feedback signal Vfb2, and an output terminal to provide comparison signal Set2 by comparing reference voltage Vref2 with feedback signal Vfb2. When feedback signal Vfb2 is smaller than reference voltage Vref2, comparison signal Set2 becomes active (e.g. logic high). Logic circuit 600 receives comparison signal Set1, comparison signal Set2 and load line data LL, and generates position signal Set based on comparison signal Set1, comparison signal Set2 and load line data LL.

FIG. 9 schematically shows a truth table of logic circuit 600 of position signal generator 33 in accordance with an embodiment of the present invention. In one embodiment, when load line data LL is in a first status (e.g., LL="1"), and when feedback signal Vfb1 is smaller than reference voltage Vref1 (Set1="1") and feedback signal Vfb2 is smaller than reference voltage Vref2 (Set2="1"), position signal Set becomes active (e.g., Set="1") to turn ON the at least one switch of switching circuit 21, otherwise Set is "0". In one embodiment, when load line data LL is in a second status (e.g., LL="0"), and when feedback signal Vfb1 is smaller than reference voltage Vref1 (Set1="1") or feedback signal Vfb2 is smaller than reference voltage Vref2 (Set2="1"), position signal Set becomes active (e.g., Set="1") to turn ON the at least one switch of control circuit 21, otherwise Set is "0". In the example of FIG. 9, comparison signals Set1-Set2 and position signal Set are active when at a high voltage level. One with ordinary skill in the art should understand that comparison signals Set1-Set2 and position signal Set may also be set active when at a low voltage level.

Figure 10:
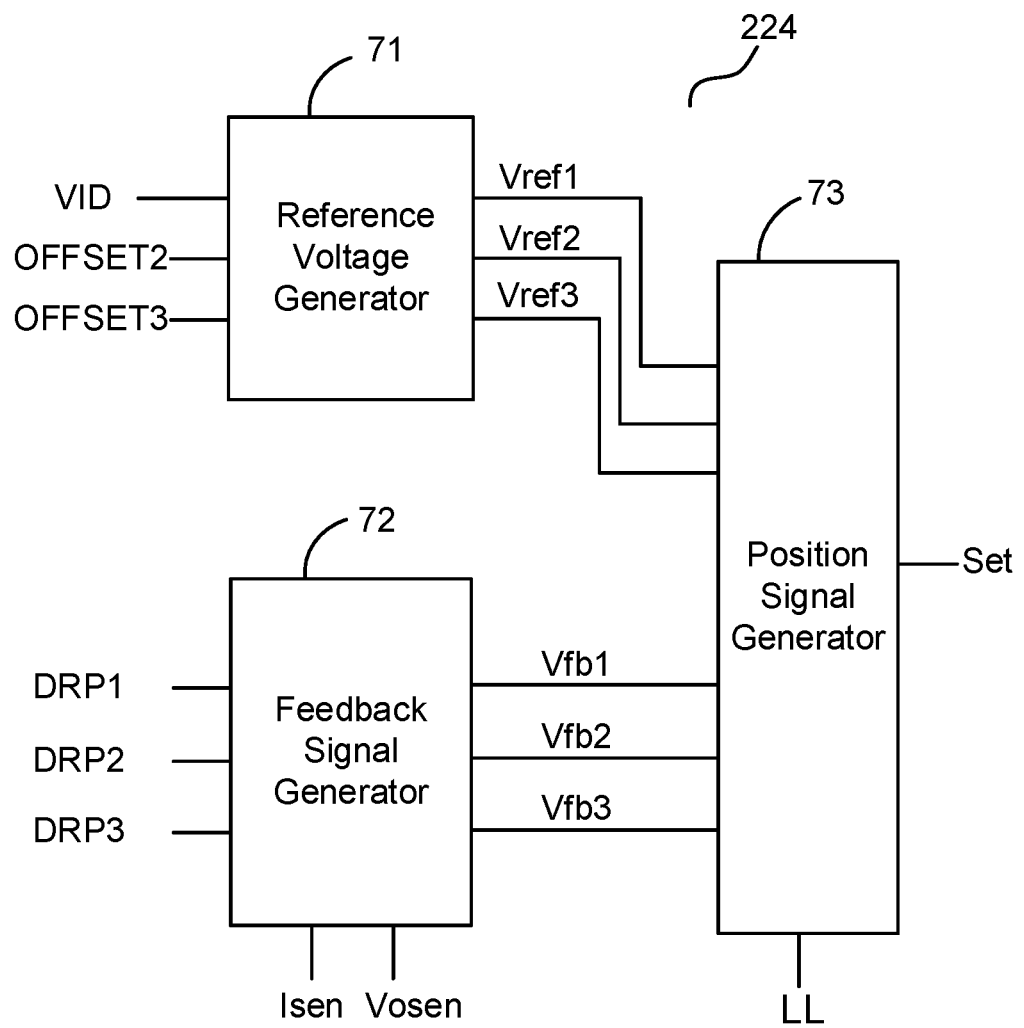
FIG. 10 schematically shows an AVP control circuit 224 in accordance with another embodiment of the present invention.

FIG. 10 schematically shows AVP control circuit 224 in accordance with another embodiment of the present invention. The embodiment of FIG. 10 employs three-stage voltage position control as an example.

In the example of FIG. 10, AVP control circuit 224 comprises a reference voltage generator 71, a feedback signal generator 72 and a position signal generator 73. Reference voltage generator 71 generates reference voltages Vref1-Vref3 based on voltage identification code VID and voltage offset datas OFFSET2-OFFSET3. In one embodiment, reference voltage Vref1 is generated based on voltage identification code VID, reference voltage Vref2 is generated based on voltage identification code VID and voltage offset data OFFSET2, and reference voltage Vref3 is generated based on voltage identification code VID and voltage offset data OFFSET3. For example, reference voltage Vref3 is equal to a sum of reference voltage Vref1 and an offset voltage Voff3 (Vref1+Voff3), wherein the offset voltage Voff3 is controlled by voltage offset data OFFSET3. In one embodiment, feedback signal generator 72 generates feedback signals Vfb1-Vfb3 based on output voltage sense signal Vosen and output current sense signal Isen under the control of voltage position resistance datas DRP1-DRP3. In one embodiment, position signal generator 73 generates position signal Set based on reference voltages Vref1-Vref3, feedback signals Vfb1-Vfb3, and load line data LL. For example, comparison signal Set1 is generated by comparing reference voltage Vref1 with feedback signal Vfb1, comparison signal Set2 is generated by comparing reference voltage Vref2 with feedback signal Vfb2, a comparison signal Set3 is generated by comparing reference voltage Vref3 with feedback signal Vfb3, and thus position signal Set is generated based on comparison signal Set1, comparison signal Set2, comparison signal Set3 and load line data LL.

Figure 11:
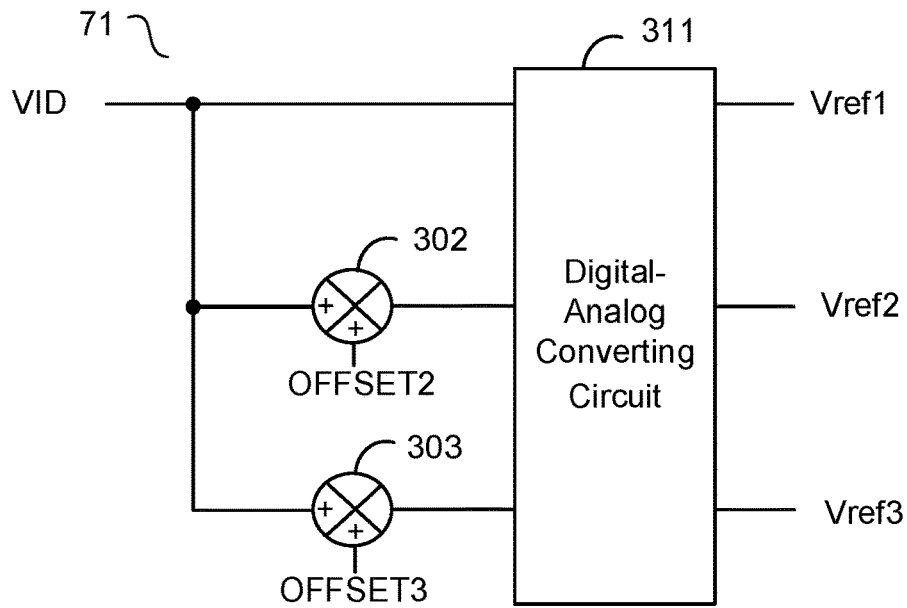
FIG. 11 schematically shows a reference voltage generator 71 in accordance with an embodiment of the present invention.

FIG. 11 schematically shows reference voltage generator 71 in accordance with an embodiment of the present invention. In the example of FIG. 11, compared with reference voltage generator 31, reference voltage generator 71 further comprises an operational circuit 303. Operational circuit 303 receives voltage identification code VID and voltage offset data OFFSET3, and sends a sum of voltage identification code VID and voltage offset data OFFSET3 (VID+OFFSET3) to digital-analog converting circuit 311. Digital-analog converting circuit 311 further generates reference voltage Vref3 based on the sum of voltage identification code VID and voltage offset data OFFSET3 (VID+OFFSET3).

Figure 12:
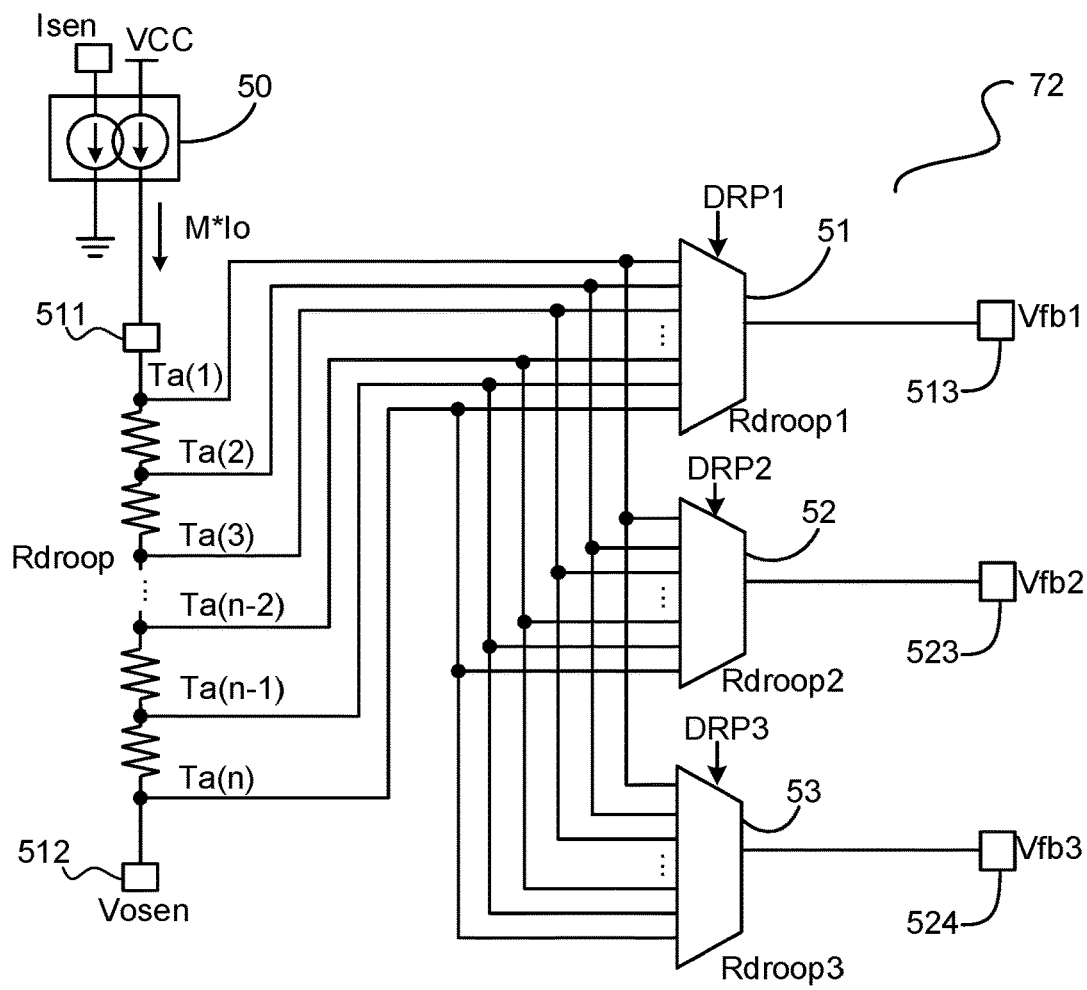
FIG. 12 schematically shows a feedback signal generator 72 in accordance with an embodiment of the present invention.

FIG. 12 schematically shows feedback signal generator 72 in accordance with an embodiment of the present invention. In the example of FIG. 12, compared with feedback signal generator 32, feedback signal generator 72 further comprises a multiplexer 53. Multiplexer 53 comprises a plurality of input terminals which are respectively coupled to the nodes of voltage position resistor Rdroop. Multiplexer 53 comprises an output terminal 524, which is configured to provide feedback signal Vfb3. Multiplexer 53 selects one node in the plurality of nodes based on voltage position resistance data DRP3 to control the resistance of voltage position resistor Rdroop3 across output terminal 524 and voltage sense terminal 512, so as to provide feedback signal Vfb3. In one embodiment, feedback signal Vfb3 equals a sum of output voltage sense signal Vosen and a voltage drop generated by mirror current M*Io flowing through voltage position resistor Rdroop3. Feedback signal Vfb3 may be expressed by the following formula (3).

$$Vfb3 = Vosen + M*Io*Rdroop3 \tag{3}$$

Figure 13:
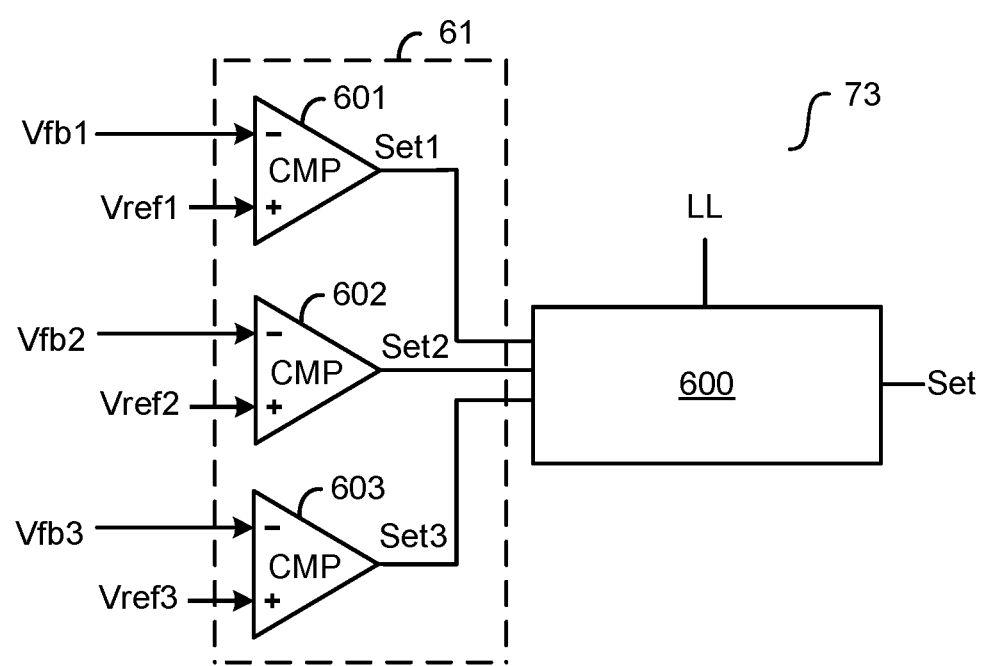
FIG. 13 schematically shows a position signal generator 73 in accordance with an embodiment of the present invention.

FIG. 13 schematically shows position signal generator 73 in accordance with an embodiment of the present invention. In the example of FIG. 13, position signal generator 73 comprises compare circuit 61 and logic circuit 600. In the example of FIG. 13, compared with FIG. 8, compare circuit 61 further comprises a comparator 603, which is configured to generate comparison signal Set3 based on feedback signal Vfb3 and reference voltage Vref3. Comparator 603 has a non-inverting input terminal to receive reference voltage Vref3, an inverting input terminal to receive feedback signal Vfb3, and an output terminal to provide comparison signal Set3 by comparing reference voltage Vref3 with feedback signal Vfb3. When feedback signal Vfb3 is smaller than reference voltage Vref3, comparison signal Set3 becomes active (e.g. logic high). Logic circuit 600 receives comparison signal Set1, comparison signal Set2, comparison signal Set3 and load line data LL, and generates position signal Set based on comparison signal Set1, comparison signal Set2, comparison signal Set3 and load line data LL.

FIG. 14 schematically shows a truth table of logic circuit 600 of position signal generator 73 in accordance with an embodiment of the present invention. In one embodiment, when load line data LL equals to "00", and when feedback signal Vfb1 is smaller than reference voltage Vref1 (Set1="1") or feedback signal Vfb2 is smaller than reference voltage Vref2 (Set2="1") or feedback signal Vfb3 is smaller than reference voltage Vref3 (Set3="1"), position signal Set becomes active (Set="1") to turn ON the at least one switch of switching circuit 21. In one embodiment, when load line data LL equals to "01", and when feedback signal Vfb3 is smaller than reference voltage Vref3 (Set3="1"), and when feedback signal Vfb1 is smaller than reference voltage Vref1 or feedback signal Vfb2 is smaller than reference voltage Vref2 (Set1="1" or Set2="1"), position signal Set becomes active (Set="1") to turn ON the at least one switch of control circuit 21. In one embodiment, when load line data LL equals to "10", and when feedback signal Vfb1 is smaller than reference voltage Vref1 (Set1="1"), and when feedback signal Vfb2 is smaller than reference voltage Vref2 or feedback signal Vfb3 is smaller than reference voltage Vref3 (Set2="1" or Set3="1"), position signal Set becomes active (Set="1") to turn ON the at least one switch of switching circuit 21. In one embodiment, when load line data LL equals to "11", and when feedback signal Vfb1 is smaller than reference voltage Vref1 (Set1="1"), feedback signal Vfb2 is smaller than reference voltage Vref2 (Set2="1"), and feedback signal Vfb3 is smaller than reference voltage Vref3 (Set3="1"), position signal Set becomes active (Set="1") to turn ON the at least one switch of switching circuit 21. In the example of FIG. 14, comparison signals Set1-Set3 and position signal Set is active at a high voltage level. One with ordinary skill in the art should understand that comparison signals Set1-Set3 and position signal Set may also be set active when at a low voltage level.

Figure 15:
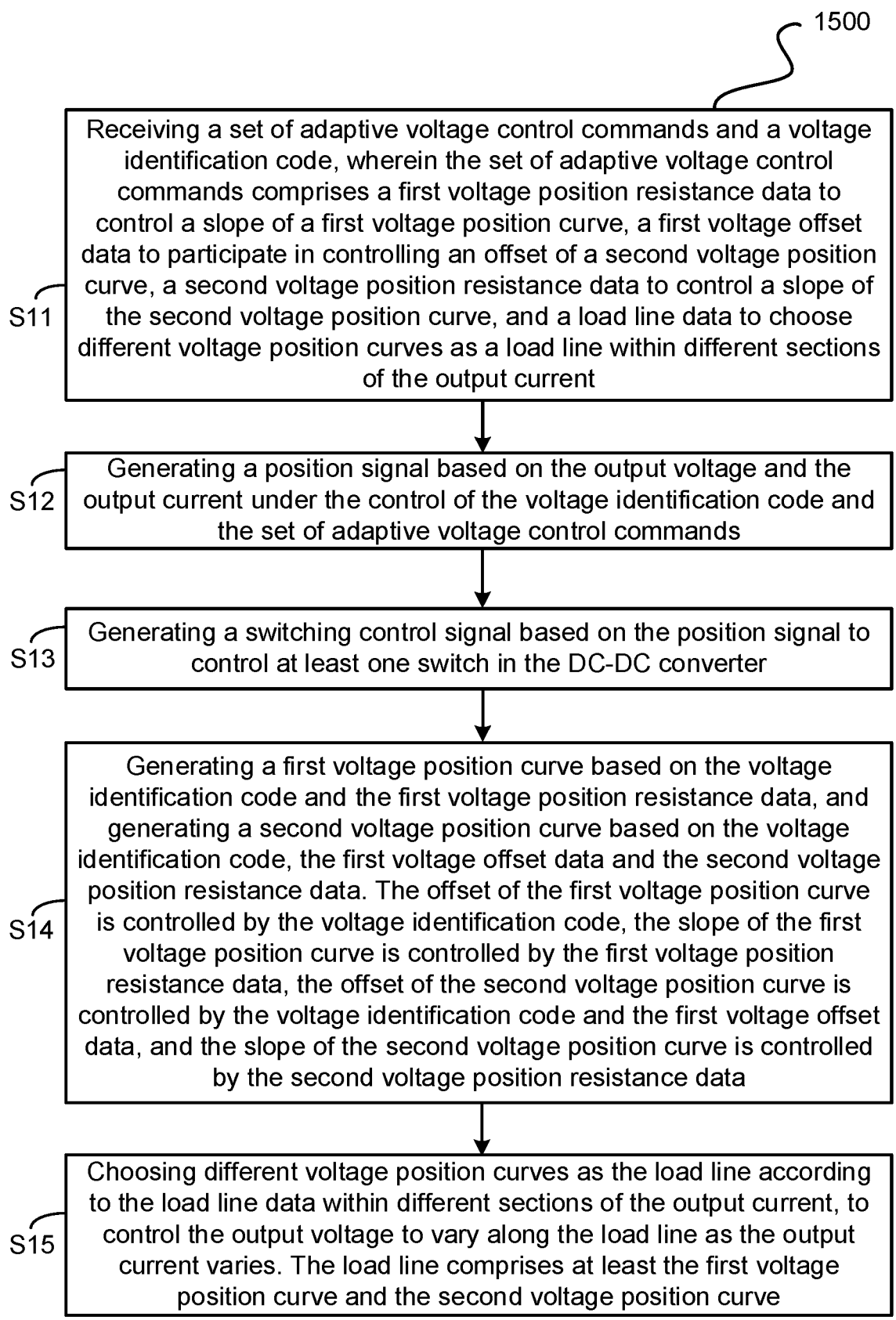
FIG. 15 illustrates an AVP control method 1500 for a DC-DC converter in accordance with an embodiment of the present invention.

FIG. 15 illustrates an AVP control method 1500 for a DC-DC converter in accordance with an embodiment of the present invention. The AVP control method for DC-DC converters shown in FIG. 15 comprises steps S11-S15, wherein the DC-DC converter receives an input voltage, and provides an output voltage and an output current.

In step S11, receiving a set of adaptive voltage control commands and a voltage identification code, wherein the set of adaptive voltage control commands comprises a first voltage position resistance data to control a slope of a first voltage position curve, a first voltage offset data to participate in controlling an offset of a second voltage position curve, a second voltage position resistance data to control a slope of the second voltage position curve, and a load line data to choose different voltage position curves as a load line within different sections of the output current.

In step S12, generating a position signal based on the output voltage and the output current under the control of the voltage identification code and the set of adaptive voltage control commands.

In step S13, generating a switching control signal based on the position signal to control at least one switch in the DC-DC converter.

In step S14, generating a first voltage position curve based on the voltage identification code and the first voltage position resistance data, and generating a second voltage position curve based on the voltage identification code, the first voltage offset data and the second voltage position resistance data. The offset of the first voltage position curve is controlled by the voltage identification code, the slope of the first voltage position curve is controlled by the first voltage position resistance data, the offset of the second voltage position curve is controlled by the voltage identification code and the first voltage offset data, and the slope of the second voltage position curve is controlled by the second voltage position resistance data.

In step S15, choosing different voltage position curves as the load line according to the load line data within different sections of the output current, to control the output voltage to vary along the load line as the output current varies. The load line comprises at least the first voltage position curve and the second voltage position curve.

Figure 16:
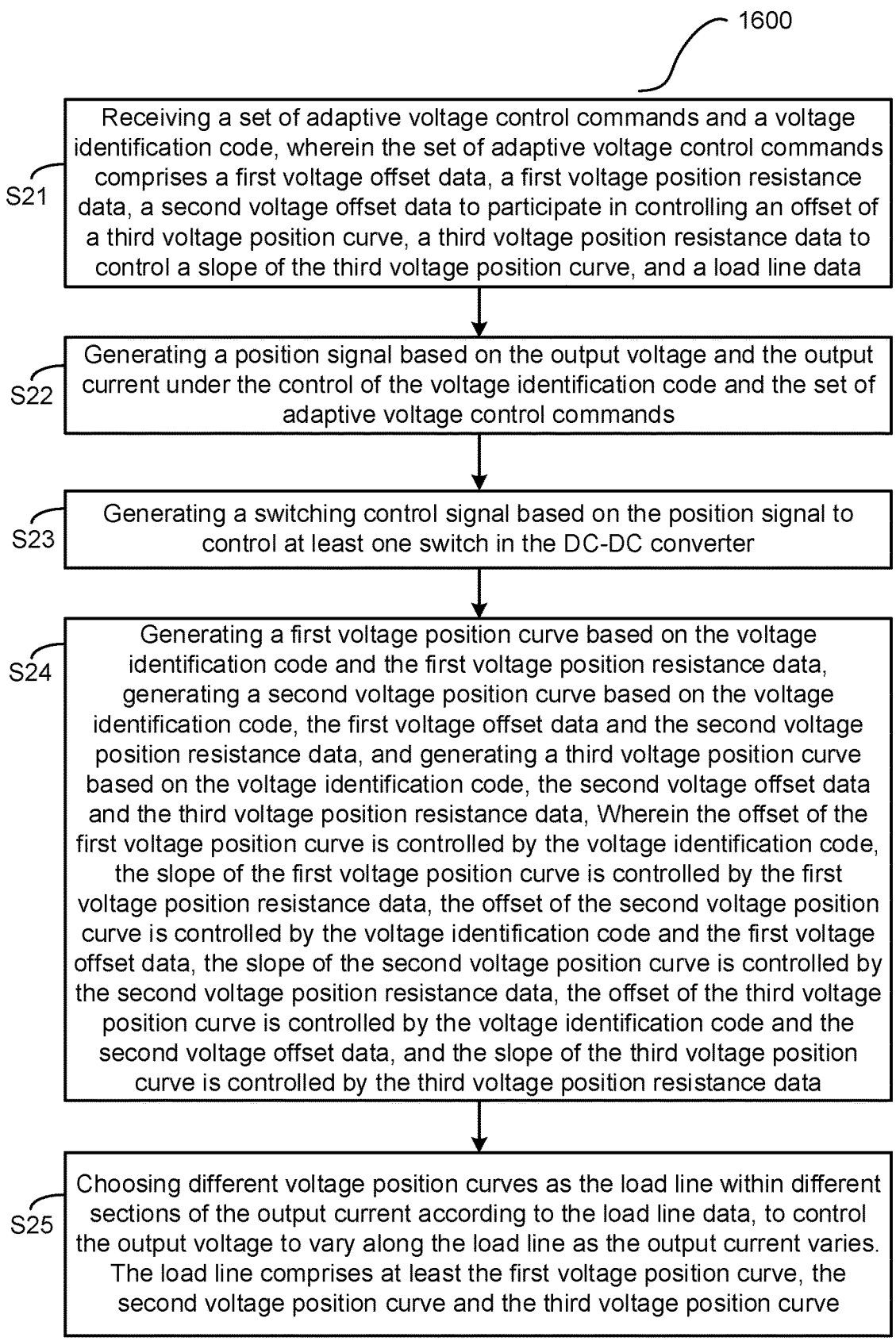
FIG. 16 illustrates an AVP control method 1600 for a DC-DC converter in accordance with another embodiment of the present invention.

FIG. 16 illustrates an AVP control method 1600 for a DC-DC converter comprising steps S21-S25 in accordance with another embodiment of the present invention.

In step S21, receiving a set of adaptive voltage control commands and a voltage identification code, wherein the set of adaptive voltage control commands comprises a first voltage offset data, a first voltage position resistance data, a second voltage offset data to participate in controlling an offset of a third voltage position curve, a third voltage position resistance data to control a slope of the third voltage position curve, and a load line data.

In step S22, generating a position signal based on the output voltage and the output current under the control of the voltage identification code and the set of adaptive voltage control commands.

In step S23, generating a switching control signal based on the position signal to control at least one switch in the DC-DC converter.

In step S24, generating a first voltage position curve based on the voltage identification code and the first voltage position resistance data, generating a second voltage position curve based on the voltage identification code, the first voltage offset data and the second voltage position resistance data, and generating a third voltage position curve based on the voltage identification code, the second voltage offset data and the third voltage position resistance data. The offset of the first voltage position curve is controlled by the voltage identification code, the slope of the first voltage position curve is controlled by the first voltage position resistance data, the offset of the second voltage position curve is controlled by the voltage identification code and the first voltage offset data, and the slope of the second voltage position curve is controlled by the second voltage position resistance data. The offset of the third voltage position curve is controlled by the voltage identification code and the second voltage offset data, and the slope of the third voltage position curve is controlled by the third voltage position resistance data.

In step S25, choosing different voltage position curves as the load line within different sections of the output current according to the load line data, to control the output voltage to vary along the load line as the output current varies. The load line comprises at least the first voltage position curve, the second voltage position curve and the third voltage position curve.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a DC-DC converter, wherein the DC-DC converter comprises at least one switch, and is configured to receive an input voltage and to provide an output voltage and an output current, the control circuit comprising:

an adaptive voltage position (AVP) control circuit, configured to provide a position signal based on the output voltage, the output current, a voltage identification code and a set of adaptive voltage control commands, wherein the set of adaptive voltage control commands comprises a load line data; and a switching control circuit, configured to provide a switching control signal based on the position signal to control the at least one switch of the DC-DC converter; wherein when the output current is smaller than a first current threshold, the control circuit is configured to choose one of a first voltage position curve, a second voltage position curve, and a third voltage position curve as a load line of the output voltage versus the output current according to the load line data, when the output current is larger than the first current threshold and smaller than a second current threshold, the control circuit is configured to choose one of a remaining two voltage position curves of the first voltage position curve, the second voltage position curve, and the third voltage position curve as the load line according to the load line data, and when the output current is larger than the second current threshold, the control circuit is configured to choose a remaining voltage position curve of the first voltage position curve, the second voltage position curve, and the third voltage position curve as the load line according to the load line data, and the control circuit is further configured to control the output voltage to vary along the load line as the output current varies.

2. The control circuit of claim 1, wherein the set of adaptive voltage control commands further comprises:
a first voltage offset data, configured to participate in controlling an offset of the second voltage position curve;
a second voltage offset data, configured to participate in controlling an offset of the third voltage position curve;
a first voltage position resistance data, configured to control a slope of the first voltage position curve;
a second voltage position resistance data, configured to control a slope of the second voltage position curve; and
a third voltage position resistance data, configured to control a slope of the third voltage position curve.

3. The control circuit of claim 1, further comprising:
a first communication interface circuit, configured to receive the voltage identification code;
a second communication interface circuit, configured to receive the set of adaptive voltage control commands; and
a memory, configured to store the set of adaptive voltage control commands received by the second communication interface circuit.

4. The control circuit of claim 1, wherein the AVP control circuit further comprises:
a reference voltage generator, configured to provide a first reference voltage, a second reference voltage and a third reference voltage based on the voltage identification code and the set of adaptive voltage control commands; and
a feedback signal generator, configured to provide a first feedback signal, a second feedback signal and a third feedback signal based on the output voltage, the output current and the set of adaptive voltage control commands.

5. The control circuit of claim 4, wherein the AVP control circuit further comprises:
a position signal generator, configured to provide the position signal based on the first reference voltage, the second reference voltage, the third reference voltage, the first feedback signal, the second feedback signal, the third feedback signal, and the load line data.

6. A control circuit for a DC-DC converter, wherein the DC-DC converter comprises at least one switch, and is configured to receive an input voltage and to provide an output voltage and an output current, the control circuit comprising:
an adaptive voltage position (AVP) control circuit, configured to provide a position signal based on the output voltage, the output current, a voltage identification code, and a set of adaptive voltage control commands; and
a switching control circuit, configured to provide a switching control signal based on the position signal to control the at least one switch of the DC-DC converter; wherein
when the output current is smaller than a current threshold, the control circuit is configured to choose one of a first voltage position curve and a second voltage position curve as a load line of the output voltage versus the output current, and when the output current is larger than the current threshold, the control circuit is configured to choose a remaining voltage position curve of the first voltage position curve and the second voltage position curve as the load line, and the control circuit is further configured to control the output voltage to vary along the load line as the output current varies.

7. The control circuit of claim 6, wherein:
the set of adaptive voltage control commands comprises a load line data; and wherein
when the load line data is in a first status, the control circuit is configured to choose the first voltage position curve as the load line when the output current is smaller than the current threshold, and choose the second voltage position curve as the load line when the output current is larger than the current threshold; and
when the load line data is in a second status, the control circuit is configured to choose the second voltage position curve as the load line when the output current is smaller than the current threshold, and choose the first voltage position curve as the load line when the output current is larger than the current threshold.

8. The control circuit of claim 6, further comprising:
a first communication interface circuit, configured to receive the voltage identification code;
a second communication interface circuit, configured to receive the set of adaptive voltage control commands; and
a memory, configured to store the set of adaptive voltage control commands received by the second communication interface circuit.

9. The control circuit of claim 6, wherein the AVP control circuit further comprises:
a reference voltage generator, configured to provide a first reference voltage, a second reference voltage and a third reference voltage based on the voltage identification code and the set of adaptive voltage control commands;
a feedback signal generator, configured to provide a first feedback signal, a second feedback signal and a third feedback signal based on the output voltage, the output current and the set of adaptive voltage control commands; and
a position signal generator, configured to provide the position signal based on the first reference voltage, the second reference voltage, the third reference voltage, the first feedback signal, the second feedback signal, the third feedback signal, and the set of adaptive voltage control commands.

10. The control circuit of claim 9, wherein the set of adaptive voltage control commands comprises a load line data, and wherein:
if the load line data is in a first status, then when the first feedback signal is smaller than the first reference voltage and the second feedback signal is smaller than the second reference voltage, the at least one switch of the DC-DC converter is turned ON by the position signal; and
if the load line data is in a second status, then when the first feedback signal is smaller than the first reference voltage or the second feedback signal is smaller than the second reference voltage, the at least one switch of the DC-DC converter is turned ON by the position signal.

11. The control circuit of claim 6, wherein the set of adaptive voltage control commands comprises a voltage offset data, a first voltage position resistance data, a second voltage position resistance data, and a load line data.

12. The control circuit of claim 11, wherein an offset of the first voltage position curve is controlled by the voltage identification code, a slope of the first voltage position curve is controlled by the first voltage position resistance data, an offset of the second voltage position curve is controlled by the voltage identification code and the voltage offset data, and a slope of the second voltage position curve is controlled by the second voltage position resistance data.

13. The control circuit of claim 11, wherein the AVP control circuit further comprises:
  a reference voltage generator, comprising an operational circuit and a digital-analog converting circuit, wherein the operational circuit is configured to receive the voltage identification code and the voltage offset data, and is configured to provide a sum of the voltage identification code and the voltage offset data, and wherein the digital-analog converting circuit is configured to provide a first reference voltage based on the voltage identification code, and provide a second reference voltage based on the sum of the voltage identification code and the voltage offset data;
  a feedback signal generator, configured to receive the first voltage position resistance data and the second voltage position resistance data, and is further configured to provide a first feedback signal based on the output voltage, the output current and the first voltage position resistance data, and generate a second feedback signal based on the output voltage, the output current and the second voltage position resistance data; and
  a position signal generator, configured to receive the load line data, the first reference voltage, the second reference voltage, the first feedback signal and the second feedback signal, and is further configured to provide the position signal.

14. The control circuit of claim 13, wherein the feedback signal generator comprises:
  a controllable current source, configured to provide a current proportional to the output current;
  a resistor, having a first terminal coupled to the controllable current source and a second terminal coupled to a voltage sense signal representative of the output voltage, the resistor comprises a plurality of nodes;
  a first multiplexer, having an output terminal and a plurality of input terminals, the plurality of input terminals are coupled to the plurality of nodes, the first multiplexer is configured to receive the first voltage position resistance data and choose one of the plurality of nodes to provide the first feedback signal at the output terminal based on the first voltage position resistance data; and
  a second multiplexer, having an output terminal and a plurality of input terminals, the plurality of input terminals are coupled to the plurality of nodes, the second multiplexer is configured to receive the second voltage position resistance data and choose one of the plurality of nodes to provide the second feedback signal at the output terminal based on the second voltage position resistance data.

15. The control circuit of claim 13, wherein the position signal generator comprises:
  a comparison circuit, configured to receive the first reference voltage, the second reference voltage, the first feedback signal and the second feedback signal, configured to provide a first comparison signal by comparing the first feedback signal with the first reference voltage, and configured to provide a second comparison signal by comparing the second feedback signal with the second reference voltage; and
  a logic circuit, configured to receive the first comparison signal, the second comparison signal and the load line data, and configured to generate the position signal based on the first comparison signal, the second comparison signal and the load line data.

16. An adaptive voltage position (AVP) control method for a DC-DC converter, wherein the DC-DC converter comprises at least one switch, and is configured to receive an input voltage and to provide an output voltage and an output current, the AVP control method comprising:
  receiving a set of adaptive voltage control commands and a voltage identification code;
  providing a position signal based on the output voltage, the output current, the voltage identification code and the set of adaptive voltage control commands; and
  providing a switching control signal based on the position signal to control the at least one switch of the DC-DC converter; wherein
  when the output current is smaller than a first current threshold, choosing one of a plurality of voltage position curves as a load line of the output voltage versus the output current, and when the output current is larger than the first current threshold, choosing one of a remaining of the plurality of voltage position curves as the load line, and further controlling the output voltage to vary along the load line as the output current varies.

17. The AVP control method of claim 16, further comprising:
  receiving the input voltage through a switching circuit, and providing the output voltage and the output current to a load; and
  receiving the voltage identification code and the set of adaptive voltage control commands through a control circuit, and controlling the at least one switch of the switching circuit based on the output voltage, the output current, the voltage identification code and the set of adaptive voltage control.

18. The AVP control method of claim 16, wherein the plurality of voltage position curves comprise a first voltage position curve and a second voltage position curve, and wherein the set of adaptive voltage control commands further comprises:
  a first voltage position resistance data, configured to control a slope of the first voltage position curve;
  a second voltage position resistance data, configured to control a slope of the second voltage position curve; and
  a first voltage offset data, configured to participate in controlling an offset of the second voltage position curve.

19. The AVP control method of claim 16, wherein the set of adaptive voltage control commands comprises a load line data, and wherein:
  if the load line data is in a first status, then a first voltage position curve is used as the load line when the output current is smaller than the first current threshold, and a second voltage position curve is used as the load line when the output current is larger than the first current threshold; and
  if the load line data is in a second status, then the second voltage position curve is used as the load line when the output current is smaller than first the current threshold, and the first voltage position curve is used as the load line when the output current is larger than the first current threshold.

20. The AVP control method of claim 16, wherein when the output current is smaller than the first current threshold, choosing one of a first voltage position curve, a second voltage position curve, and a third voltage position curve as the load line, when the output current is larger than the first current threshold and smaller than a second current threshold, choosing one of a remaining two voltage position curves of the first voltage position curve, the second voltage position curve, and the third voltage position curve as the load line, and when the output current is larger than the second current threshold, choosing a remaining voltage position curve of the first voltage position curve, the second voltage position curve, and the third voltage position curve as the load line.

* * * * *